US012763814B2

(12) United States Patent
Zhu et al.

(10) Patent No.: US 12,763,814 B2
(45) Date of Patent: Oct. 13, 2026

(54) CONFIGURING MULTIPLE SUBARRAYS FOR A RECONFIGURABLE INTELLIGENT SURFACE DEVICE

(71) Applicant: LENOVO (BEIJING) LIMITED, Beijing (CN)

(72) Inventors: Chenxi Zhu, Fairfax, VA (US); Bingchao Liu, Beijing (CN); Yi Zhang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 106 days.

(21) Appl. No.: 18/691,827

(22) PCT Filed: Sep. 13, 2021

(86) PCT No.: PCT/CN2021/117993

§ 371 (c)(1),
(2) Date: Mar. 13, 2024

(87) PCT Pub. No.: WO2023/035267

PCT Pub. Date: Mar. 16, 2023

(65) Prior Publication Data

US 2024/0348290 A1 Oct. 17, 2024

(51) Int. Cl.
*H04B 7/026* (2017.01)
*H04B 7/06* (2006.01)

(52) U.S. Cl.
CPC ............. *H04B 7/026* (2013.01); *H04B 7/063* (2013.01)

(58) Field of Classification Search
CPC ...................................................... H04B 7/026
USPC .......................................................... 375/267
See application file for complete search history.

(56) References Cited

U.S. PATENT DOCUMENTS

| | | | | |
|---|---|---|---|---|
| 2003/0095066 | A1* | 5/2003 | Brogden | H01Q 21/22 342/372 |
| 2017/0069967 | A1 | 3/2017 | Shrekenhamer | |
| 2019/0056541 | A1* | 2/2019 | Roberts | G02B 5/136 |
| 2021/0175931 | A1 | 6/2021 | Choi et al. | |
| 2023/0041198 | A1* | 2/2023 | Chen | H04B 7/0617 |
| 2023/0171624 | A1* | 6/2023 | Iwabuchi | H04B 7/04026 370/252 |

(Continued)

FOREIGN PATENT DOCUMENTS

| | | | |
|---|---|---|---|
| CN | 111010219 | A | 4/2020 |
| CN | 111416646 | A | 7/2020 |

(Continued)

OTHER PUBLICATIONS

You et al., "Fast Beam Training for IRS-Assisted Multiuser Communications", IEEE Wireless Communications Letters, vol. 9, No. 11, Jun. 30, 2020, pp. 1-5.

(Continued)

*Primary Examiner* — Lihong Yu
(74) *Attorney, Agent, or Firm* — Kunzler Needham Hilton

(57) ABSTRACT

Apparatuses, methods, and systems are disclosed for configuring multiple subarrays for a reconfigurable intelligent surface device. One method includes transmitting, from a controller, a control signal to a reconfigurable intelligent surface device to configure a plurality of subarrays. The control signal includes: a number of subarrays corresponding to the plurality of subarrays; and phase control parameters of each subarray of the plurality of subarrays.

19 Claims, 11 Drawing Sheets

(56) References Cited

U.S. PATENT DOCUMENTS

| | | | | |
|---|---|---|---|---|
| 2023/0370931 | A1* | 11/2023 | Wang | H04W 36/30 |
| 2024/0137077 | A1* | 4/2024 | Elshafie | H04B 7/0617 |

FOREIGN PATENT DOCUMENTS

| | | | |
|---|---|---|---|
| CN | 111542054 | A | 8/2020 |
| CN | 111698046 | A | 9/2020 |
| CN | 111864399 | A | 10/2020 |
| CN | 112272384 | A | 1/2021 |
| CN | 112564752 | A | 3/2021 |
| CN | 112784467 | A | 5/2021 |
| CN | 112804695 | A | 5/2021 |
| CN | 113189902 | A | 7/2021 |
| WO | 2021236510 | A1 | 11/2021 |

OTHER PUBLICATIONS

PCT/CN2021/117993, "Notification of Transmittal of the International Search Report and the Written Opinion of the International Searching Authority, or the Declaration", International Searching Authority, May 27, 2022, pp. 1-10.

Arun et al., "RFocus: Beamforming Using Thousands of Passive Antennas", Massachusetts Institute of Technology, 17th USENIX Symposium on Networked Systems Design and Implementation (NSDI '20), Feb. 25-27, 2020, pp. 1-17.

Di Renzo et al., "Smart radio environments empowered by reconfigurable AI meta-surfaces: an idea whose time has come", Journal on Wireless Communications and Networking, 2019, pp. 1-20.

Huang et al., "Holographic MIMO Surfaces for 6G Wireless Networks: Opportunities, Challenges, and Trends", arXiv: 1911.12296v3 [cs.IT], Apr. 19, 2020, pp. 1-8.

Li et al., "Design of Wideband Multifunction Antenna Array Based on Multiple Interleaved Subarrays", International Journal of Antennas and Propagation vol. 2016, Article ID 1320726, Jan. 20, 2016, pp. 1-8.

Liang et al., "Large Intelligent Surface/Antennas (LISA): Making Reflective Radios Smart", arXiv:1906.06578v1 [cs. IT], Jun. 15, 2019, pp. 1-10.

Liaskos et al., "A New Wireless Communication Paradigm through Software-controlled Metasurfaces", Foundation for Research and Technology, IEEE Communications Magazine, Sep. 2018, pp. 1-9.

Shabanpour et al., "Ultrafast reprogrammable multifunctional vanadium-dioxide-assisted metasurface for dynamic THz wavefront engineering", Department of Electrical Engineering, Iran University of Science and Technology, Retrieved Feb. 29, 2024, pp. 1-28.

Wu et al., "Intelligent Reflecting Surface Aided Wireless Communications: A Tutorial", arXiv:2007.02759v2 [cs.IT], Jul. 7, 2020, pp. 1-74.

Wu et al., "Towards Smart and Reconfigurable Environment: Intelligent Reflecting Surface Aided Wireless Network", arXiv: 1905.00152v5 [cs.IT], Aug. 30, 2019, pp. 1-8.

Zhang et al., "Broadband high-efficiency multiple vortex beams generated by an interleaved geometric-phase multifunctional metasurface", Optical Society of America, Jun. 8, 2020, pp. 1-14.

* cited by examiner

CONFIGURING MULTIPLE SUBARRAYS FOR A RECONFIGURABLE INTELLIGENT SURFACE DEVICE

FIELD

The subject matter disclosed herein relates generally to wireless communications and more particularly relates to configuring multiple subarrays for a reconfigurable intelligent surface device.

BACKGROUND

In certain wireless communications networks, a reconfigurable intelligent surface device may be configured for optimal operation. In such networks, a single configuration for the entire reconfigurable intelligent surface device may not handle multiple different configurations.

BRIEF SUMMARY

Methods for configuring multiple subarrays for a reconfigurable intelligent surface device are disclosed. Apparatuses and systems also perform the functions of the methods. In one embodiment, the method includes transmitting, from a controller, a control signal to a reconfigurable intelligent surface device to configure a plurality of subarrays. The control signal includes: a number of subarrays corresponding to the plurality of subarrays; and phase control parameters of each subarray of the plurality of subarrays.

An apparatus for configuring multiple subarrays for a reconfigurable intelligent surface device, in one embodiment, includes a controller. In some embodiments, the apparatus includes a transmitter that transmits a control signal to a reconfigurable intelligent surface device to configure a plurality of subarrays. The control signal includes: a number of subarrays corresponding to the plurality of subarrays; and phase control parameters of each subarray of the plurality of subarrays.

In various embodiments, a method for configuring multiple subarrays for a reconfigurable intelligent surface device includes receiving, at a reconfigurable intelligent surface device, a control signal from a controller. The control signal is used to configure a plurality of subarrays. The control signal includes: a number of subarrays corresponding to the plurality of subarrays; and phase control parameters of each subarray of the plurality of subarrays.

In some embodiments, an apparatus for configuring multiple subarrays for a reconfigurable intelligent surface device includes a reconfigurable intelligent surface device. In such embodiments, the apparatus includes a receiver that receives a control signal from a controller. The control signal is used to configure a plurality of subarrays. The control signal includes: a number of subarrays corresponding to the plurality of subarrays; and phase control parameters of each subarray of the plurality of subarrays.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
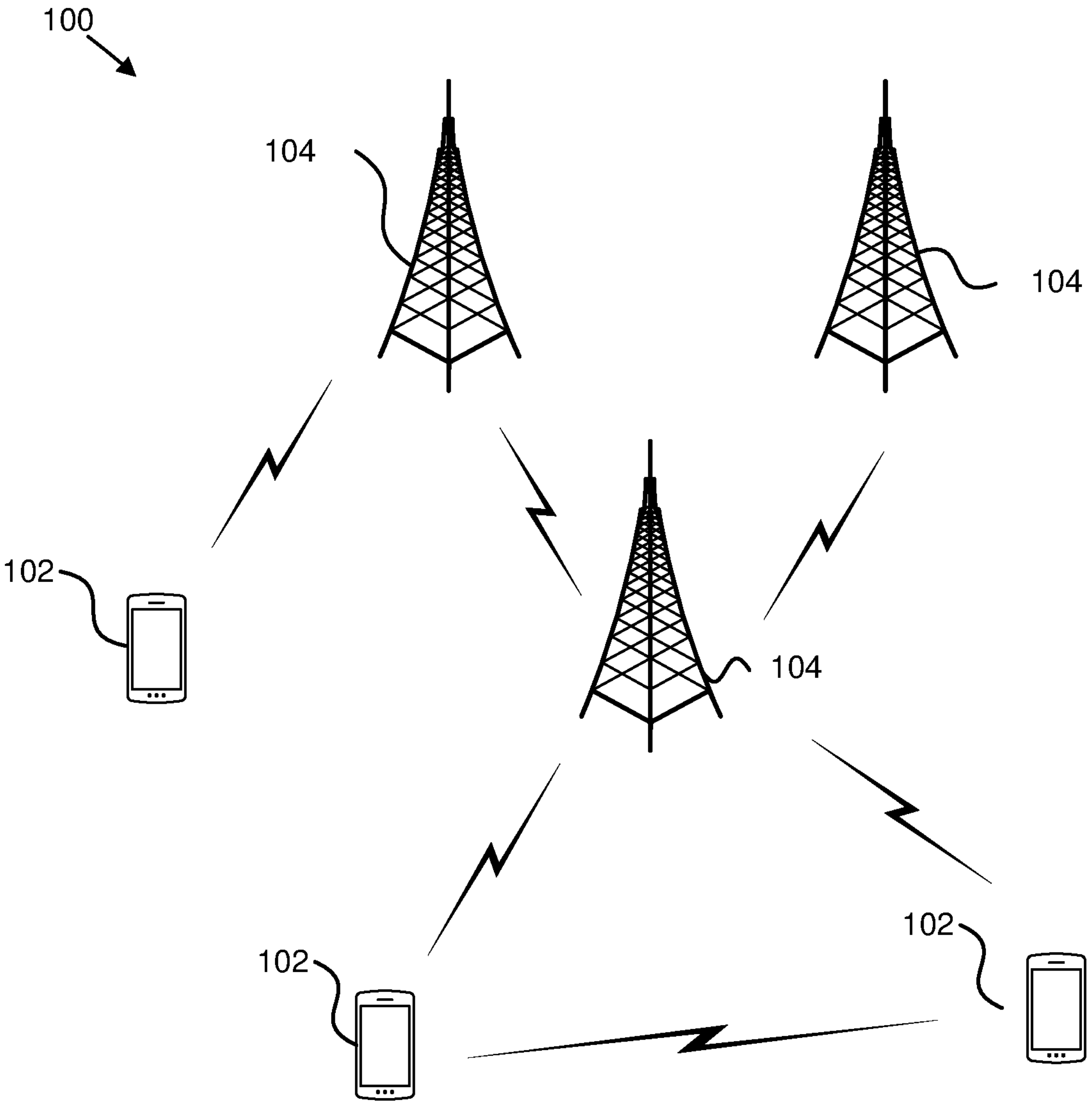
FIG. 1 is a schematic block diagram illustrating one embodiment of a wireless communication system for configuring multiple subarrays for a reconfigurable intelligent surface device.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (“RAM”), a read-only memory (“ROM”), an erasable programmable read-only memory (“EPROM” or Flash memory), a portable compact disc read-only memory (“CD-ROM”), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the “C” programming language, or the like, and/or machine languages such as assembly languages. The code may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a local area network (“LAN”) or a wide area network (“WAN”), or the connection may be made to an external computer (for example, through the Internet using an Internet Service Provider).

Reference throughout this specification to “one embodiment,” “an embodiment,” or similar language means that a particular feature, structure, or characteristic described in connection with the embodiment is included in at least one embodiment. Thus, appearances of the phrases “in one embodiment,” “in an embodiment,” and similar language throughout this specification may, but do not necessarily, all refer to the same embodiment, but mean “one or more but not all embodiments” unless expressly specified otherwise. The terms “including,” “comprising,” “having,” and variations thereof mean “including but not limited to,” unless expressly specified otherwise. An enumerated listing of items does not imply that any or all of the items are mutually exclusive, unless expressly specified otherwise. The terms “a,” “an,” and “the” also refer to “one or more” unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for configuring multiple subarrays for a reconfigurable intelligent surface device. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, user equipment ("UE"), user terminals, a device, or by other terminology used in the art. The remote units 102 may communicate directly with one or more of the network units 104 via uplink ("UL") communication signals and/or the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNodeB ("gNB"), a Home Node-B, a RAN, a relay node, a device, a network device, an integrated and access backhaul ("IAB") node, a donor IAB node, a controller, a RIS device, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 5G or NG (Next Generation) standard of the third generation partnership program ("3GPP") protocol, wherein the network unit 104 transmits using NG RAN technology. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit downlink ("DL") communication signals to serve the remote units 102 in the time, frequency, and/or spatial domain.

In various embodiments, a network unit 104 may transmit, from a controller, a control signal to a reconfigurable intelligent surface device to configure a plurality of subarrays. The control signal includes: a number of subarrays corresponding to the plurality of subarrays; and phase control parameters of each subarray of the plurality of subarrays. Accordingly, a network unit 104 may be used for configuring multiple subarrays for a reconfigurable intelligent surface device.

In some embodiments, a network unit 104 may receive, at a reconfigurable intelligent surface device, a control signal from a controller. The control signal is used to configure a plurality of subarrays. The control signal includes: a number of subarrays corresponding to the plurality of subarrays; and phase control parameters of each subarray of the plurality of subarrays. Accordingly, a network unit 104 may be used for configuring multiple subarrays for a reconfigurable intelligent surface device.

Figure 2:
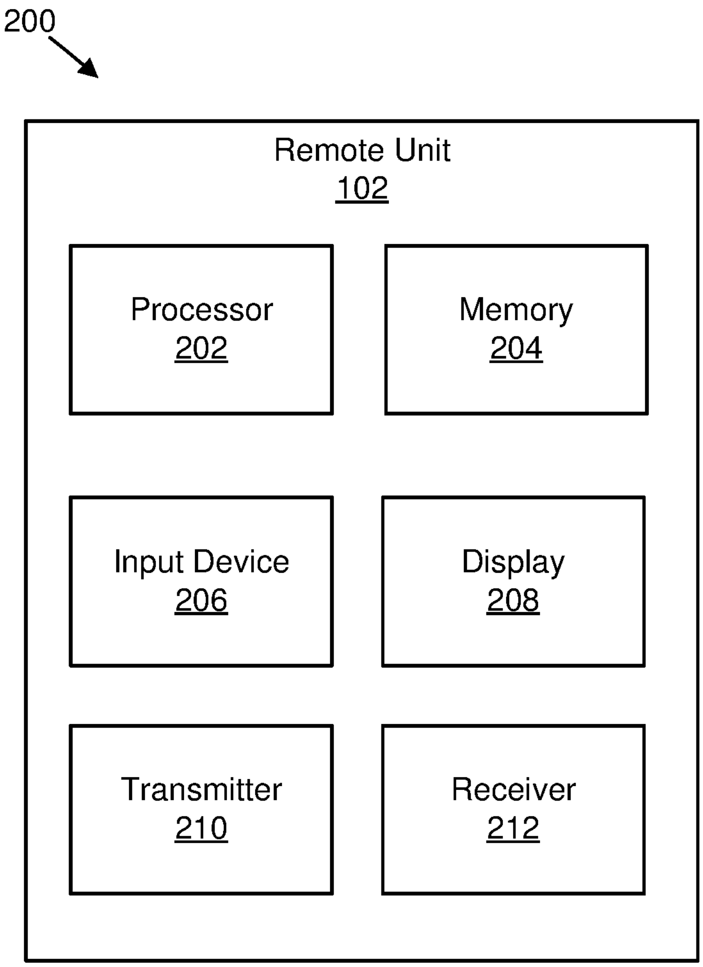
FIG. 2 is a schematic block diagram illustrating one embodiment of an apparatus that may be used for configuring multiple subarrays for a reconfigurable intelligent surface device.

FIG. 2 depicts one embodiment of an apparatus 200 that may be used for configuring multiple subarrays for a reconfigurable intelligent surface device. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD") display, an LED display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
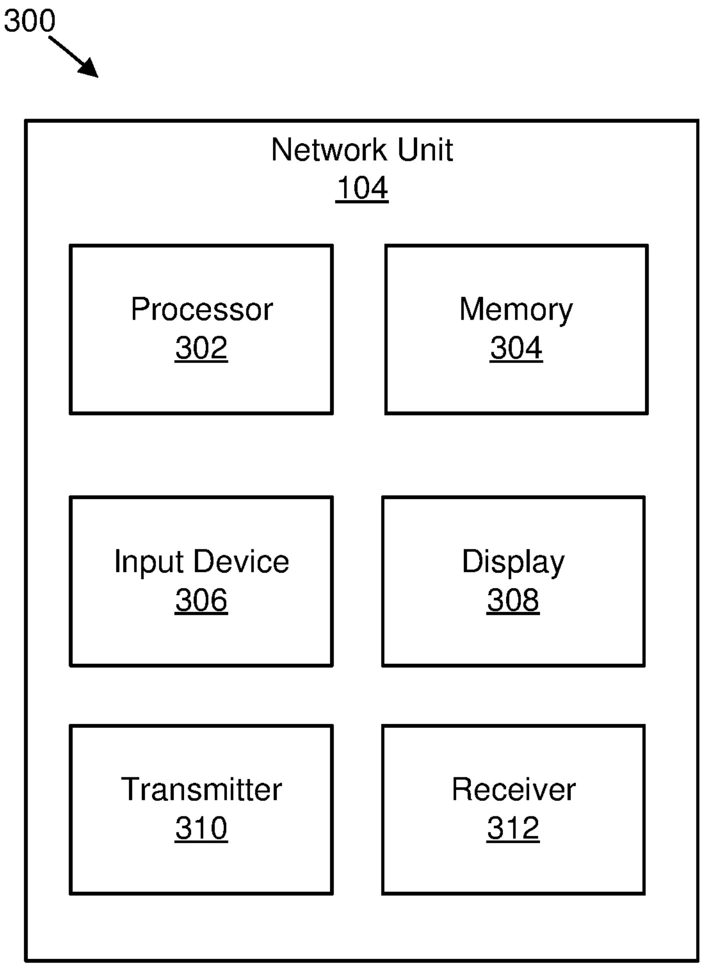
FIG. 3 is a schematic block diagram illustrating another embodiment of an apparatus that may be used for configuring multiple subarrays for a reconfigurable intelligent surface device.

FIG. 3 depicts another embodiment of an apparatus 300 that may be used for configuring multiple subarrays for a reconfigurable intelligent surface device. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310: transmits a control signal to a reconfigurable intelligent surface device to configure a plurality of subarrays. The control signal includes: a number of subarrays corresponding to the plurality of subarrays; and phase control parameters of each subarray of the plurality of subarrays.

In certain embodiments, the receiver 312: receives a control signal from a controller. The control signal is used to configure a plurality of subarrays. The control signal includes: a number of subarrays corresponding to the plurality of subarrays; and phase control parameters of each subarray of the plurality of subarrays.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In certain embodiments, a reconfigurable intelligent surface ("RIS") is a technology that may play a key role in sixth generation ("6G") communications. A RIS may be a large smart surface placed in a wireless propagation environment as an artificial and programmable reflector to boost a radio signal from a transmitter to a receiver. In such embodiments, a RIS has a planar 2 dimensional array of metaatoms (e.g., unit cells, elements) where each passive element (or group of elements) may be set to one of several states with different reflecting coefficients. Together they give the RIS a macro-property to manipulate the impinged electromagnetic ("EM") wave and divert it to a direction of an intended receiver. This may improve the performance at the receiver as well as reduce the interference to other users.

In some embodiments, a RIS may operate at a very high frequency range (e.g., such as terahertz (THz)). In such embodiments, as the size of the antenna array increases, the spatial and/or angular resolution of the array improves as dictated by the fundamental principle of array signal processing. Due to a sparse channel property, the singular modes of the channel between a large transmit ("TX") antenna array and a large receiver ("RX") antenna array include a set of TX beams (angle of departures ("AODs") from the TX side). For the reflection channel from the TX to the RX through a RIS surface, the reflected beam may be manipulated by the RIS surface in 1 or 2 dimensions (e.g., horizontal and vertical). With a pair of parameters controlling the phase of the metaatoms in a 2D array, a single beam may be reflected towards a desired direction. As described herein, multiple beams may be reflected with different angle of arrivals ("AOAs") and towards different AODs on a two dimensional ("2D") metasurface through subarray partitioning.

In various embodiments, a RIS may use a best parameter of each RIS element in a communication system. In such embodiments, the RIS may be used to engineer a radio propagation environment and to enhance the performance of wireless transmissions. In certain embodiments, a parameter for each element of an entire RIS surface may be optimized. In some embodiments, transmitting RIS encoding parameters to an RIS surface may be difficult at it may incur a huge overhead. In various embodiments, a linear array may be partitioned into multiple subarrays for transmission and/or reception for broadband radar applications, where different subarrays may be optimized for different frequencies so they may cover a wide frequency range. In certain embodiments, a new algorithm may be used to generate one dimensional ("1D") irregular linear subarrays. In some embodiments, multiple subarrays may be constructed to reflect signals in different directions of the same frequency. In such embodiments, subarrays may include a set of adjacent elements, where a receiver is embedded in each subarray for channel estimation. The subarrays may be constructed in hardware and may not be reprogrammed. A number of subarrays may be interleaved to generate multiple orthogonal amplitude modulation ("OAM") beams. The meta-atoms required to generate OAM waves may have several different geometries and may be built into an RIS surface as hardware, and they may not be reprogrammed to generate variable number of beams.

In some embodiments, a size of an RIS surface may be large enough to have a spatial (e.g., angular) resolution to dissolve any two beams with different AODs or AOAs. This may not be a problem for a THz range where a large antenna array is needed. In such embodiments, the RIS surface may include a 1D or 2D regular array of metaatoms with a configurable reflection property. In various embodiments, a reflection on a RIS surface may be performed by controlling reflection coefficients of metaatoms on the surface of a 1D or 2D array. In certain embodiments, an RIS may be controlled to produce a strongest reflection between a TX and an RX. In such embodiments, the strongest incoming beam is chosen from the TX and reflected towards the direction of the strongest beam to the RX, effectively maximizing the energy reflected by the RIS. In such embodiments, only 1 data layer may be transmitted over a reflected beam. In some embodiments, to support a transmission rank higher than 1, more than one beam may be reflected on an RIS surface. Each beam may be used to carry a data stream, and together higher rank transmission may be achieved through reflection on the RIS surface. In various embodiments, multiple beams may be reflected on an RIS surface to support multiple data layer transmission.

Figure 4:
FIG. 4 is a schematic block diagram illustrating one embodiment of a division of a 1D array into subarrays.

In certain embodiments, each array (e.g., 1D or 2D) with discrete Fourier transform ("DFT") encoding reflects one incident beam towards one direction. The direction of the reflected beam may be controlled by controlling the DFT parameter of the array. To reflect multiple beams, an entire array can be partitioned into a set of subarrays, each subarray operating like an array of a smaller size. In such embodiments, a subarray may include adjacent elements of the whole array. FIG. 4 is a schematic block diagram illustrating one embodiment of a division of a 1D array 400 into subarrays. In FIG. 4, the 1D array 400 is partitioned into 2 subarrays, where subarray 1 includes a left half of the 1D array 400, and the subarray 2 includes a right half of the 1D array 400. Each subarray has 50% of the elements of the 1D array 400. Thus, the relative size of each subarray is 0.5.

Figure 5:
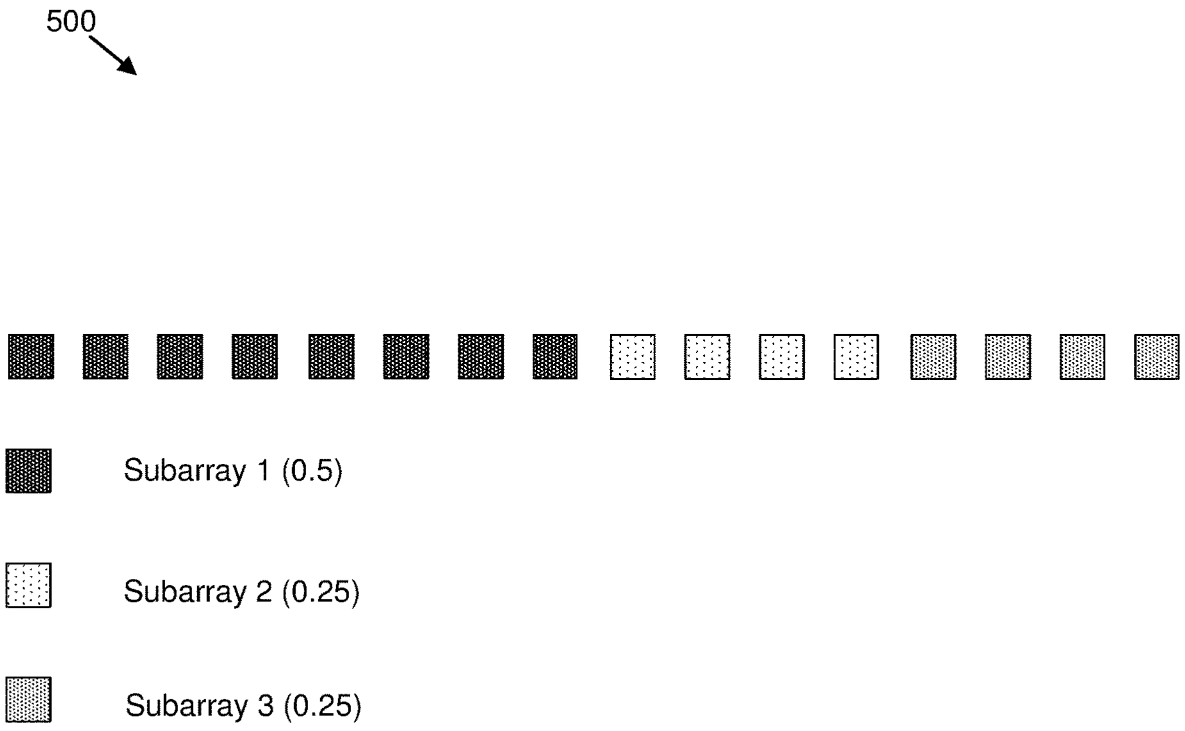
FIG. 5 is a schematic block diagram illustrating another embodiment of a division of a 1D array into subarrays.

FIG. 5 is a schematic block diagram illustrating another embodiment of a division of a 1D array 500 into subarrays. The 1D array 500 is split into 3 subarrays, with relative size of 50%, 25%, and 25%. For all M subarrays, their relative sizes ($s_m$) add up to 1, so every element is assigned to a subarray:

$$\sum_1^M s_m = 1.$$

Figure 6:
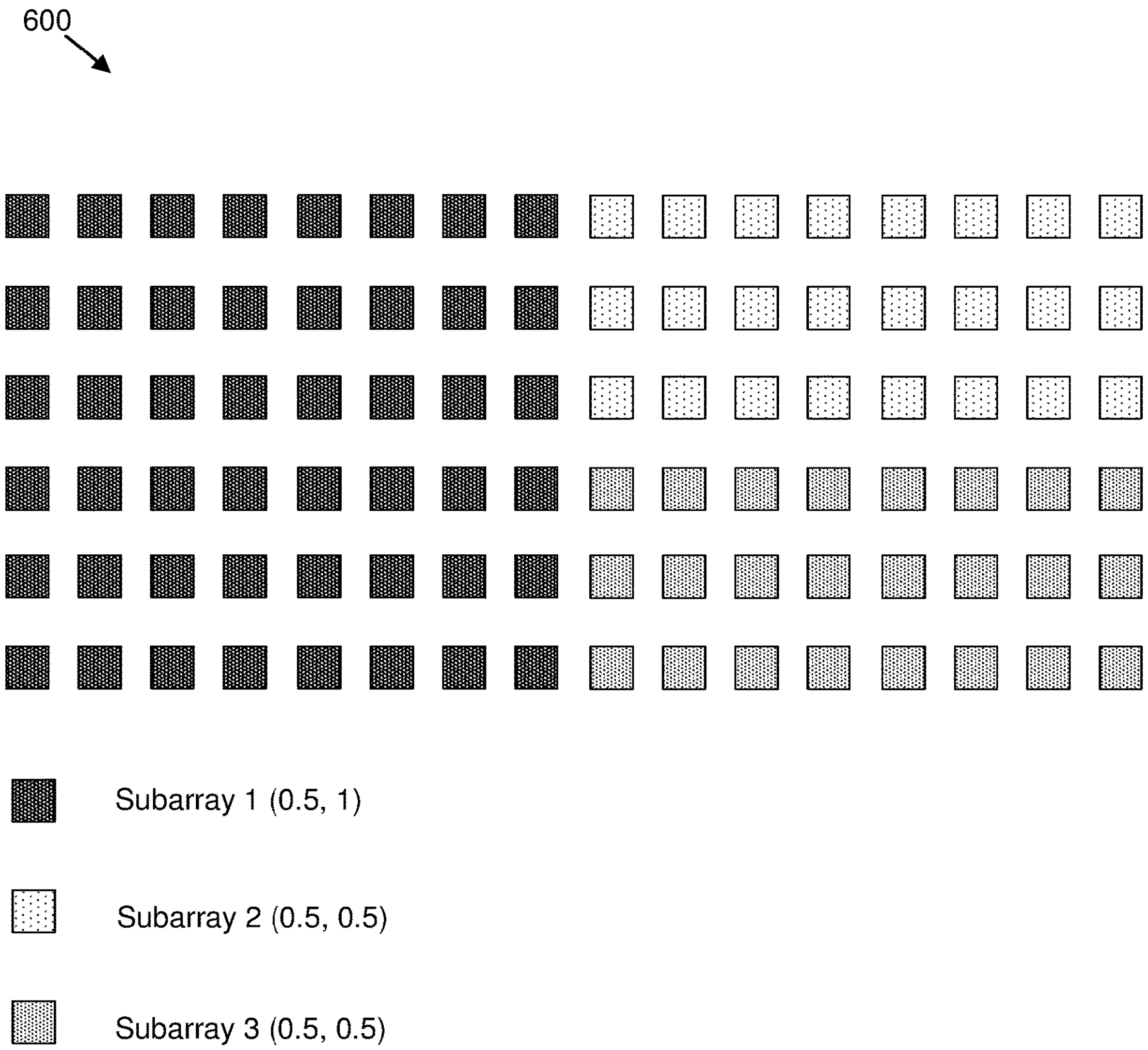
FIG. 6 is a schematic block diagram illustrating one embodiment of a division of a 2D array into subarrays.

FIG. 6 is a schematic block diagram illustrating one embodiment of a division of a 2D array 600 into subarrays. As may be appreciated, for a 2D subarray, the elements of a subarray are subsampled in X and Y directions separately. Each subarray m has a ratio of $$(s_m^x, s_m^y)$$

in the X and Y directions. FIG. 6 shows an example of the 2D array 600 divided into 3 subarrays, with ratio in the X and Y directions (0.5, 1), (0.5, 0.5), and (0.5, 0.5) respectively. Every element is assigned to a subarray, so $$\sum_1^M s_m^x s_m^y = 1.$$

Figure 7:
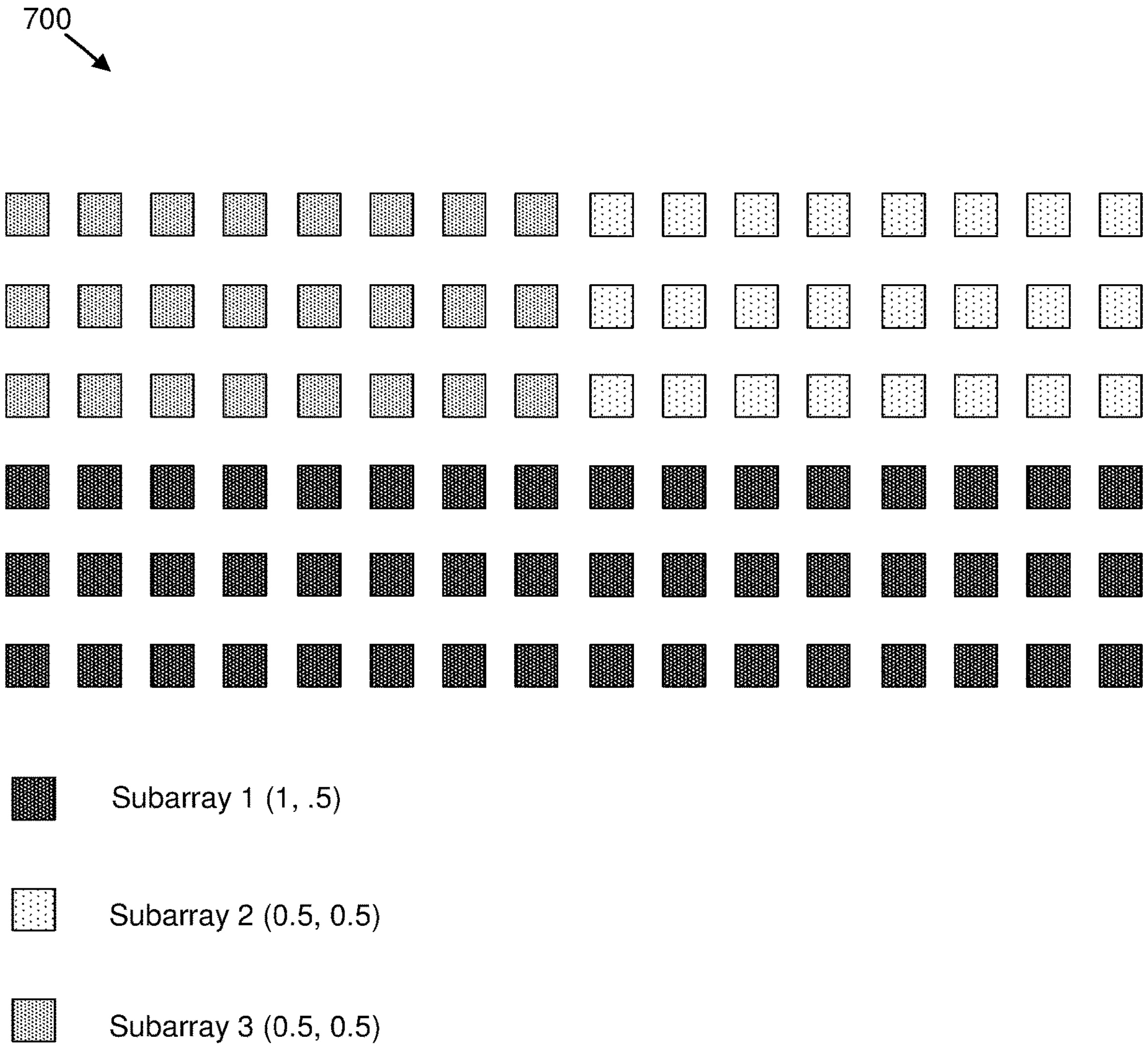
FIG. 7 is a schematic block diagram illustrating another embodiment of a division of a 2D array into subarrays.

FIG. 7 is a schematic block diagram illustrating another embodiment of a division of a 2D array 700 into subarrays.

Figure 8:
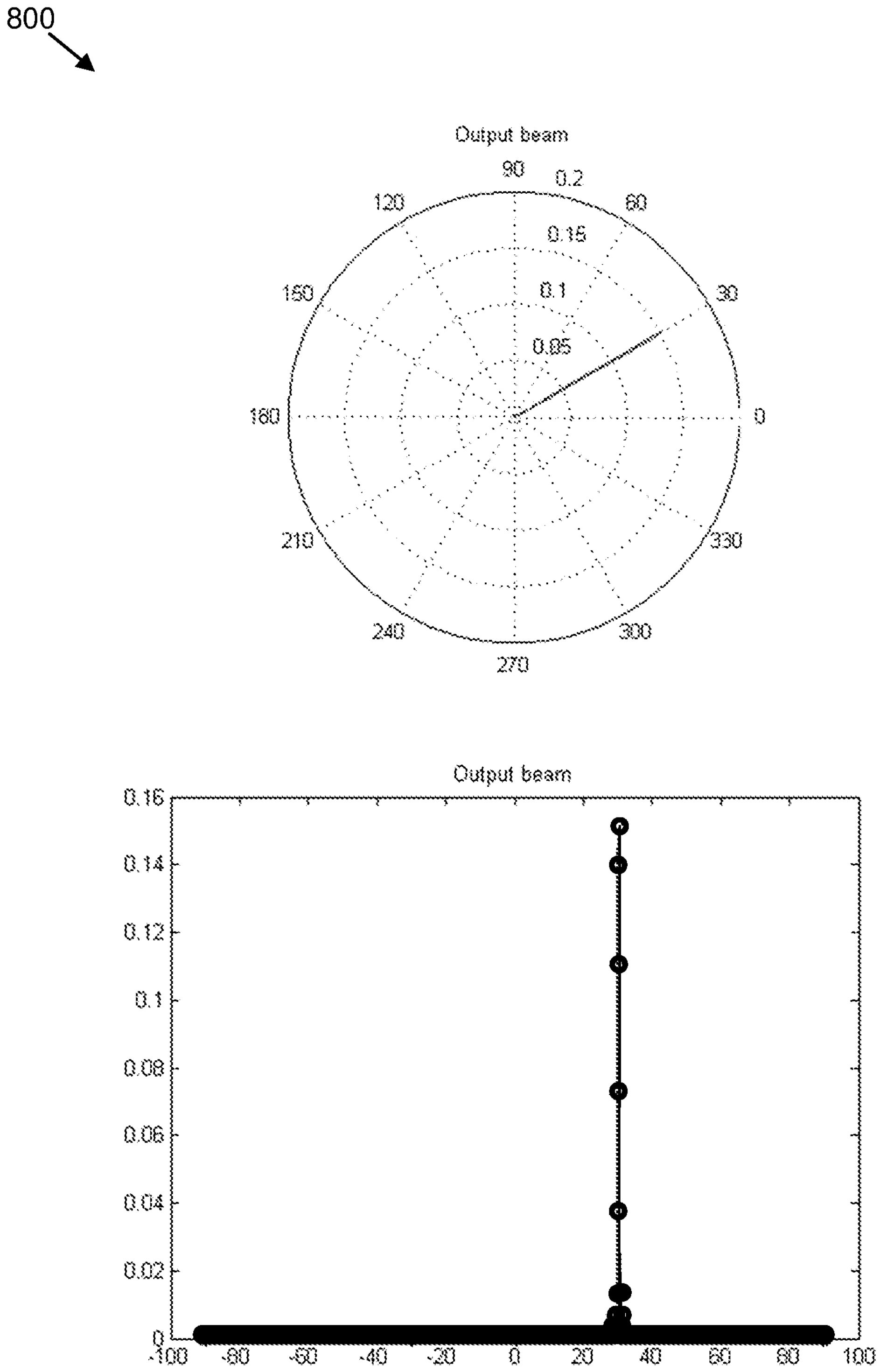
FIG. 8 is a schematic block diagram illustrating one embodiment of spatial resolution of a 1D array.

FIG. 8 is a schematic block diagram 800 illustrating one embodiment of spatial resolution of a 1D array. As subarrays are smaller than an original array, their spatial resolutions may be lower than the original array. However, if the original array is large enough (e.g., with hundreds or thousands of elements in each dimension), the resolution of the subarrays are high enough to resolve different AOAs and AODs of the beams reflected on it. FIG. 8 shows the angular spectrum of a 1D array with 200 elements with interspacing of 0.5λ. Moreover, Table 1 shows the spatial (e.g., angular) resolution of 1D array of different sizes. It is illustrated that with 100 elements the subarray still provides an angular resolution of 1.1°, sufficient to resolve AOAs and AODs in most channels.

TABLE 1

Spatial Resolution of Antenna Subarray of Different Sizes - the Inter-element Spacing is 0.5λ

| Subarray size | Angular solution (°) |
|---|---|
| 1000 | 0.11 |
| 800 | 0.14 |
| 300 | 0.4 |
| 200 | 0.6 |
| 100 | 1.1 |
| 50 | 2.1 |

Figure 9:
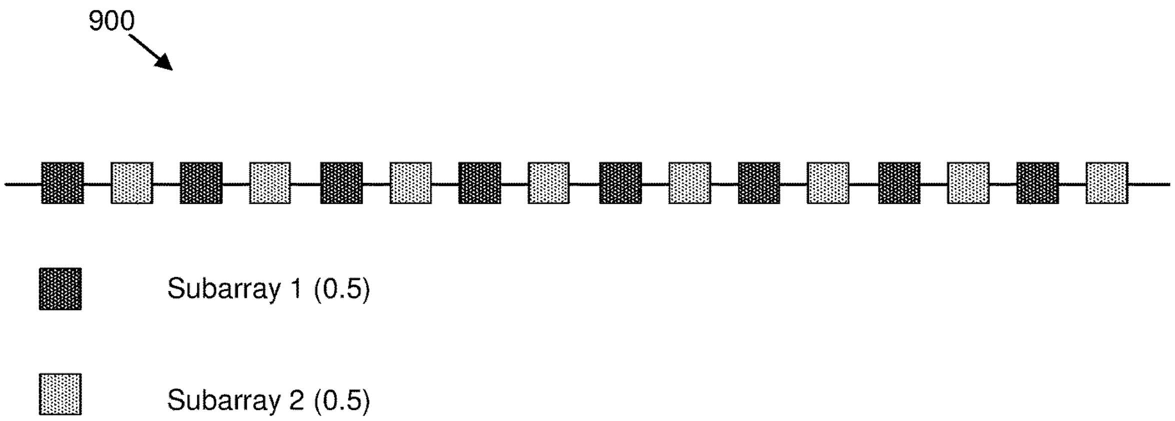
FIG. 9 is a schematic block diagram illustrating a further embodiment of a division of a 1D array into subarrays.

In some embodiments, a subarray includes subsampled elements with a certain subsampling rate. The physical size of each subarray may span the size of the original array while the density of metaatoms of the subarray is reduced compared with the original array. FIG. 9 is a schematic block diagram illustrating a further embodiment of a division of a 1D array 900 into subarrays. In FIG. 9, the 1D array 900 with N elements has interspacing d. In FIG. 9, the 1D array 900 is partitioned into 2 subarrays, where subarray 1 includes the odd numbered elements, and subarray 2 includes the even numbered elements. Each subarray spans the original length of Nd with 50% of the number of elements. The relative size (e.g., ratio) of each subarray is 0.5. The inter-elements spacing for each subarray is 2d (e.g., from the start of a one element in the subarray to the start of the next element in the same subarray there are two total elements) with a subsampling factor of 2.

Figure 10:
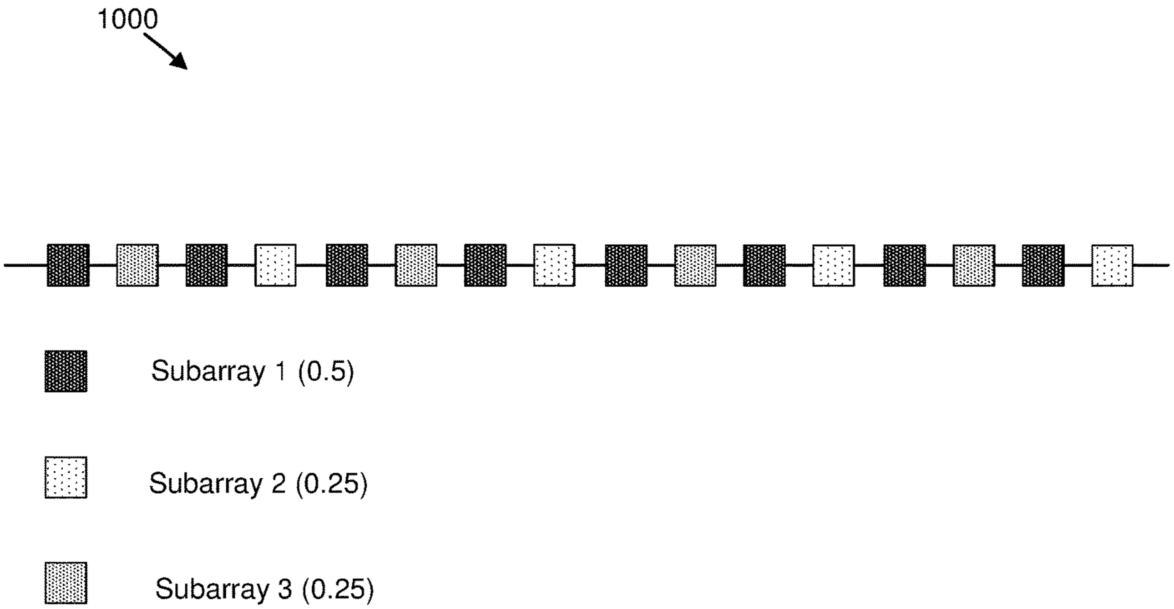
FIG. 10 is a schematic block diagram illustrating yet another embodiment of a division of a 1D array into subarrays.

FIG. 10 is a schematic block diagram illustrating yet another embodiment of a division of a 1D array 1000 into subarrays. In FIG. 10, the 1D array 1000 is split into 3 subarrays, with relative size of 50%, 25%, and 25%. The interspacing for the subarrays is 2d, 4d, and 4d. Each subarray spans the size of the original array. Because the spatial resolution of an antenna array is mainly determined by its physical size, the subarrays have a similar spatial resolution to the original array and may resolute AOAs and AODs just like the original array as long as its density of elements is above a certain threshold to avoid aliasing. For all M subarrays, their relative sizes ($s_m$) add up to 1 so every element is assigned to some subarray.

$$\sum_1^M s_m = 1.$$

The subsampling factor for subarray m is $$\frac{1}{s_m}.$$

For a 2D subarray, the elements of a subarray are subsampled in X and Y directions separately. Each subarray m has a ratio of $$(s_m^x, s_m^y)$$

in the X and Y direction, with subsampling factor $$(1/s_m^x, 1/s_m^y).$$

Figure 11:
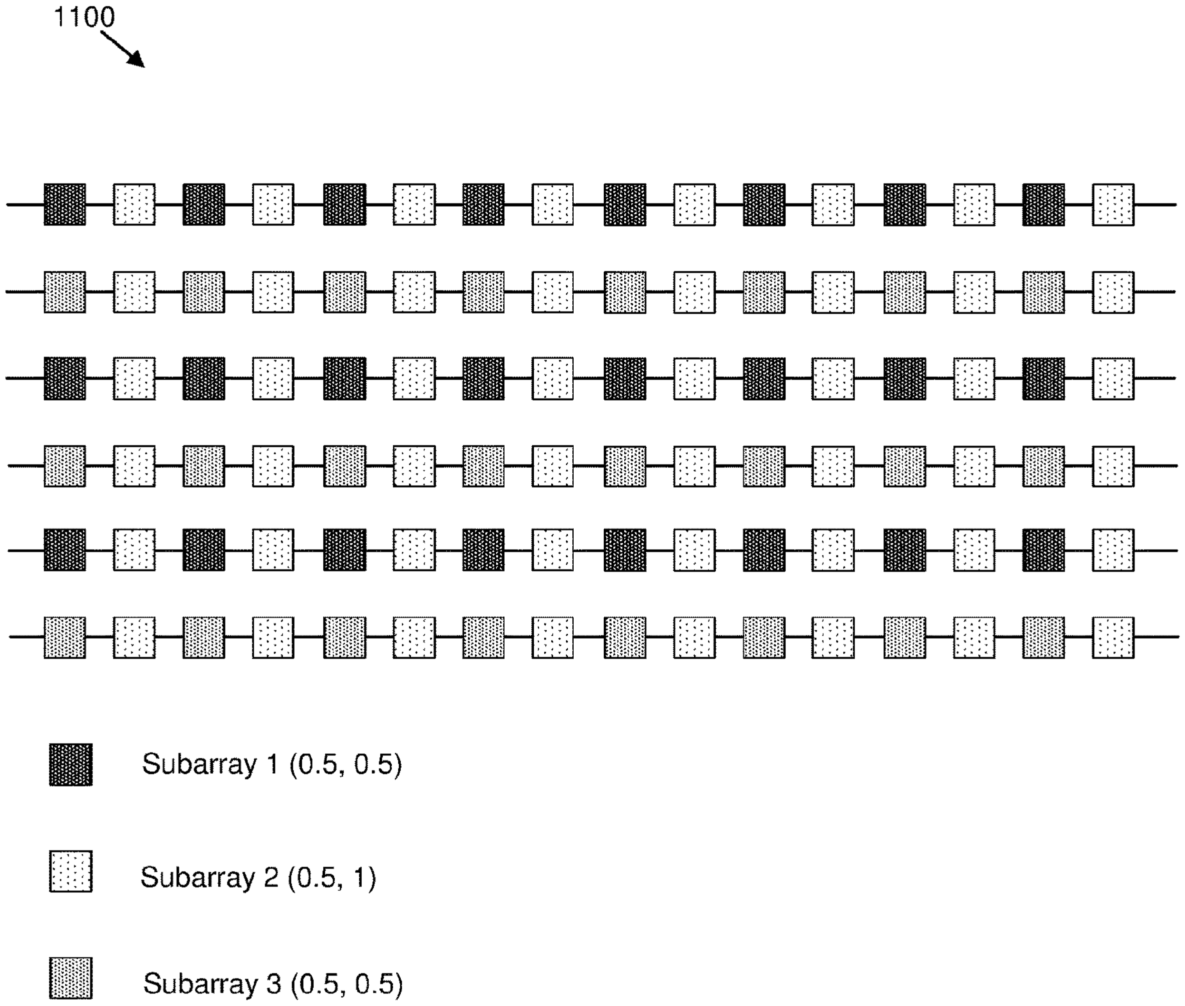
FIG. 11 is a schematic block diagram illustrating a further embodiment of a division of a 2D array into subarrays.

FIG. 11 is a schematic block diagram illustrating a further embodiment of a division of a 2D array 1100 into subarrays. Specifically, FIG. 11 shows an example of the 2D array 1100 divided into 3 subarrays with ratios in the X and Y directions (0.5, 0.5), (0.5, 1), and (0.5, 0.5) respectively. The relative size (e.g., ratio of elements in the entire RIS assigned to it) of subarray m is $$s_m^x s_m^y.$$

Every element is assigned to a subarray, so $$\sum_1^M s_m^x s_m^y = 1.$$

The entire RIS may be divided into subarrays as the interdistance of elements of the same subarray are below a threshold (e.g., such as a 0.5 wavelength). If the interdistance is too large, an aliasing effect may become visible and the beam may be reflected towards other directions.

In certain embodiments, in a communication system, the controller of the RIS may be separated from the RIS. It may be in another entity, such as a base station. In such embodiments, the base station may send the control signal to the RIS through a base station ("BS") RIS ("BS-RIS") interface, including how the RIS is partitioned into subarrays (e.g., subarray size) and the control parameters for each subarray. The subarray partitioning scheme (e.g., scheme 1 or scheme 2) may be fixed, configured in advance, signalled separately, or together with the subarray information. Each subarray may be independently controlled to reflect a single incident beam towards a desired direction. The reflection of subarray i may be controlled by 1 (e.g., for a 1D array) or 2 (e.g., for a 2D array) parameters. The control of a 1D or a 2D RIS surface (e.g., a subarray) using phase gradients or equivalent may be used.

In some embodiments, for a 2D array, an example of a control signal is as follows:

$$\{(r_1^x, r_1^y, p_1^x, p_1^y), (r_2^x, r_2^y, p_2^x, p_2^y), (r_3^x, r_3^y, p_3^x, p_3^y)\},$$

where $$r_i^x, r_i^y$$

signal the size (e.g., ratio) of subarray i in the X and Y direction, and $$p_i^x, p_i^y$$

signals the phase control parameters in the X and Y directions. The RIS partitions its surface into 3 subarrays and configures each subarray with corresponding phase parameters. In such embodiments, the BS has signalled to the RIS to configure the subarrays using scheme 1 or scheme 2.

In various embodiments, for a 1D array, an example of a control signal is as follows: $\{(r_1, p_1), (r_2, p_2), (r_3, p_3)\}$, where $r_i$ signals the size (e.g., ratio) of subarray i, and $p_i$ signals its phase control parameter. The RIS partitions its surface into 3 subarrays and configures them with the corresponding phase parameters.

In some embodiments, another mode of operation is that the BS only signals the number of subarrays (M) and the phase control parameter of each subarray. In this mode all subarrays have the same size. The RIS device may partition the RIS surface as follows:

In various embodiments, for 1D subarray, the control signal is: $\{M, (p_1), (p_2), \ldots (p_M)\}$.

In certain embodiments, a size of subarray i is $$r_i = \frac{1}{M}.$$

In some embodiments, for a 2D subarray, the control signal is $$\{M, (p_1^x, p_1^y), (p_2^x, p_2^y), \ldots, (p_M^x, p_M^y)\}.$$

In various embodiments, the sizes (e.g., area) of all the subarrays are 1/M. In such embodiments, the shape (e.g, ratio of the subarray in the x and y direction) may be determined by the RIS for given M by the RIS device with three alternatives:

$$r_i^x = r_i^y = 1/\sqrt{M}; \quad 1)$$

$$r_i^y = 1, r_i^x = 1/M; \text{ or} \quad 2)$$

$$r_i^x = 1, r_i^y = 1/M. \quad 3)$$

Moreover, in such embodiments, these three partitioning schemes will result in different shapes of the subarrays. Which partitioning scheme to use may be fixed or configured with a transmission to the RIS device by the BS. On receiving the control signal, the RIS partitions its elements into subarrays with the size and the phase gradient parameters as instructed.

Figure 12:
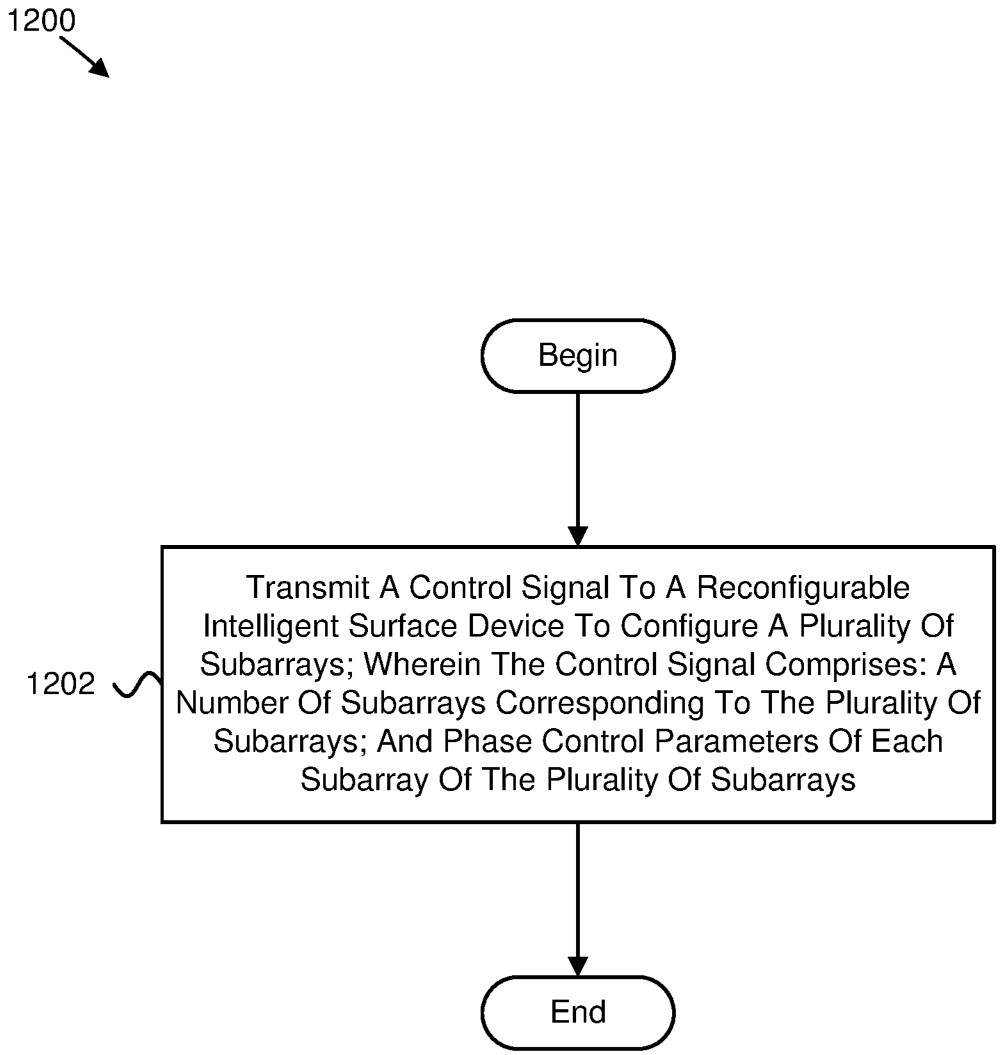
FIG. 12 is a schematic flow chart diagram illustrating one embodiment of a method for configuring multiple subarrays for a reconfigurable intelligent surface device.

FIG. 12 is a schematic flow chart diagram illustrating one embodiment of a method 1200 for configuring multiple subarrays for a reconfigurable intelligent surface device. In some embodiments, the method 1200 is performed by an apparatus, such as the network unit 104 (e.g., a controller). In certain embodiments, the method 1200 may be performed by a processor executing program code, for example, a microcontroller, a microprocessor, a CPU, a GPU, an auxiliary processing unit, a FPGA, or the like.

The method 1200 may include transmitting 1202, from a controller, a control signal to a reconfigurable intelligent surface device to configure a plurality of subarrays. The control signal includes: a number of subarrays corresponding to the plurality of subarrays; and phase control parameters of each subarray of the plurality of subarrays.

In certain embodiments, each subarray of the plurality of subarrays comprises adjacent elements on a surface of the reconfigurable intelligent surface device. In some embodiments, each subarray of the plurality of subarrays comprises interleaved elements on a surface of the reconfigurable intelligent surface device. In various embodiments, the control signal comprises a relative size of each subarray of the plurality of subarrays in each dimension.

In one embodiment, the phase control parameters comprise a phase gradient of each subarray of the plurality of subarrays in each dimension. In certain embodiments, in response to the control signal not indicating a size of each subarray of the plurality of subarrays in each dimension, each subarray of the plurality of subarrays has the same size. In some embodiments, the method 1200 further comprises transmitting information indicating a partitioning scheme to the reconfigurable intelligent surface device or configuring the partitioning scheme at the reconfigurable intelligent surface device prior to transmitting the control signal.

In various embodiments, the partitioning scheme comprises an adjacent scheme or an interleaved scheme. In one embodiment, the controller is located with a base station. In certain embodiments, the reconfigurable intelligent surface device comprises only a one dimensional array of elements.

In some embodiments, the reconfigurable intelligent surface device comprises a two dimensional array of elements. In various embodiments, a relative size and the phase control parameters of each subarray of the plurality of subarrays are provided for a first dimension and a second dimension. In one embodiment, a ratio of the plurality of subarrays in the first dimension to the plurality of subarrays in the second dimension is based on the number of subarrays.

Figure 13:
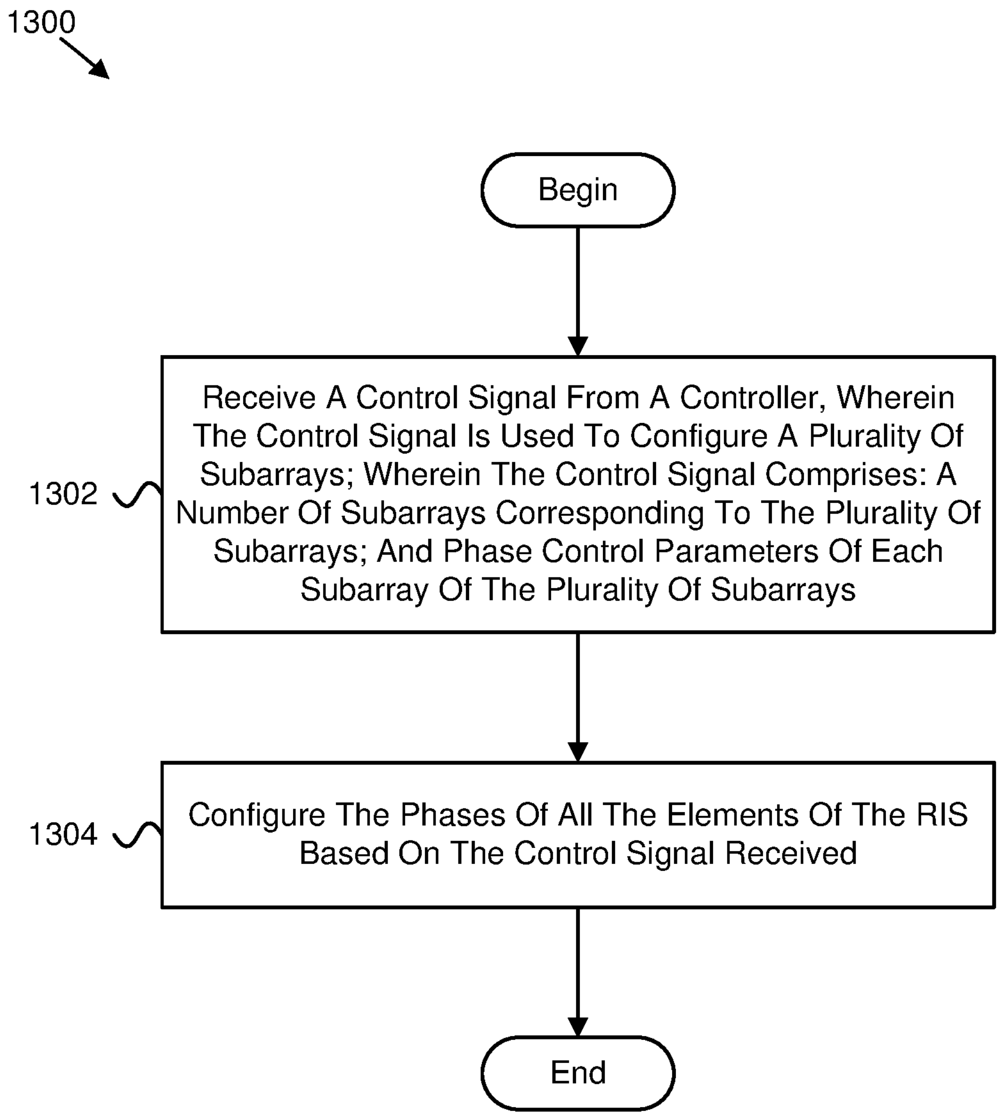
FIG. 13 is a schematic flow chart diagram illustrating another embodiment of a method for configuring multiple subarrays for a reconfigurable intelligent surface device.

FIG. 13 is a schematic flow chart diagram illustrating another embodiment of a method 1300 for configuring multiple subarrays for a reconfigurable intelligent surface device. In some embodiments, the method 1300 is performed by an apparatus, such as the network unit 104 (e.g., a RIS device). In certain embodiments, the method 1300 may be performed by a processor executing program code, for example, a microcontroller, a microprocessor, a CPU, a GPU, an auxiliary processing unit, a FPGA, or the like.

The method 1300 may include receiving 1302, at a reconfigurable intelligent surface device, a control signal from a controller. The control signal is used to configure a plurality of subarrays. The control signal includes: a number of subarrays corresponding to the plurality of subarrays; and phase control parameters of each subarray of the plurality of subarrays. In certain embodiments, the method 1300 includes configuring 1304 the phases of all the elements of the RIS based on the control signal received. To configure the entire RIS into multiple subarrays, the RIS device needs to determine the subset of elements that belong to each subarray, and configure its phase parameter based on its (X and Y) location on the subarray and the phase gradient parameters in the X and Y directions.

In certain embodiments, each subarray of the plurality of subarrays comprises adjacent elements on a surface of the reconfigurable intelligent surface device. In some embodiments, each subarray of the plurality of subarrays comprises interleaved elements on a surface of the reconfigurable intelligent surface device. In various embodiments, the control signal comprises a relative size of each subarray of the plurality of subarrays in each dimension.

In one embodiment, the phase control parameters comprise a phase gradient of each subarray of the plurality of subarrays in each dimension. In certain embodiments, in response to the control signal not indicating a size of each subarray of the plurality of subarrays in each dimension, each subarray of the plurality of subarrays has the same size. In some embodiments, the method 1300 further comprises receiving information indicating a partitioning scheme or configuring the partitioning scheme prior to receiving the control signal.

In various embodiments, the partitioning scheme comprises an adjacent scheme or an interleaved scheme. In one embodiment, the control signal is received from a base station. In certain embodiments, the reconfigurable intelligent surface device comprises only a one dimensional array of elements.

In some embodiments, the reconfigurable intelligent surface device comprises a two dimensional array of elements. In various embodiments, a relative size and the phase control parameters of each subarray of the plurality of subarrays are provided for a first dimension and a second dimension. In one embodiment, a ratio of the plurality of subarrays in the first dimension to the plurality of subarrays in the second dimension is based on the number of subarrays.

In one embodiment, a method of a controller comprises: transmitting a control signal to a reconfigurable intelligent surface device to configure a plurality of subarrays; wherein the control signal comprises: a number of subarrays corresponding to the plurality of subarrays; and phase control parameters of each subarray of the plurality of subarrays.

In certain embodiments, each subarray of the plurality of subarrays comprises adjacent elements on a surface of the reconfigurable intelligent surface device.

In some embodiments, each subarray of the plurality of subarrays comprises interleaved elements on a surface of the reconfigurable intelligent surface device.

In various embodiments, the control signal comprises a relative size of each subarray of the plurality of subarrays in each dimension.

In one embodiment, the phase control parameters comprise a phase gradient of each subarray of the plurality of subarrays in each dimension.

In certain embodiments, in response to the control signal not indicating a size of each subarray of the plurality of subarrays in each dimension, each subarray of the plurality of subarrays has the same size.

In some embodiments, the method further comprises transmitting information indicating a partitioning scheme to the reconfigurable intelligent surface device or configuring the partitioning scheme at the reconfigurable intelligent surface device prior to transmitting the control signal.

In various embodiments, the partitioning scheme comprises an adjacent scheme or an interleaved scheme.

In one embodiment, the controller is located with a base station.

In certain embodiments, the reconfigurable intelligent surface device comprises only a one dimensional array of elements.

In some embodiments, the reconfigurable intelligent surface device comprises a two dimensional array of elements.

In various embodiments, a relative size and the phase control parameters of each subarray of the plurality of subarrays are provided for a first dimension and a second dimension.

In one embodiment, a ratio of the plurality of subarrays in the first dimension to the plurality of subarrays in the second dimension is based on the number of subarrays.

In one embodiment, an apparatus comprises a controller. The apparatus further comprises: a transmitter that transmits a control signal to a reconfigurable intelligent surface device to configure a plurality of subarrays; wherein the control signal comprises: a number of subarrays corresponding to the plurality of subarrays; and phase control parameters of each subarray of the plurality of subarrays.

In certain embodiments, each subarray of the plurality of subarrays comprises adjacent elements on a surface of the reconfigurable intelligent surface device.

In some embodiments, each subarray of the plurality of subarrays comprises interleaved elements on a surface of the reconfigurable intelligent surface device.

In various embodiments, the control signal comprises a relative size of each subarray of the plurality of subarrays in each dimension.

In one embodiment, the phase control parameters comprise a phase gradient of each subarray of the plurality of subarrays in each dimension.

In certain embodiments, in response to the control signal not indicating a size of each subarray of the plurality of subarrays in each dimension, each subarray of the plurality of subarrays has the same size.

In some embodiments, the apparatus further comprises a processor, wherein the transmitter transmits information indicating a partitioning scheme to the reconfigurable intelligent surface device or the processor configures the partitioning scheme at the reconfigurable intelligent surface device prior to transmitting the control signal.

In various embodiments, the partitioning scheme comprises an adjacent scheme or an interleaved scheme.

In one embodiment, the controller is located with a base station.

In certain embodiments, the reconfigurable intelligent surface device comprises only a one dimensional array of elements.

In some embodiments, the reconfigurable intelligent surface device comprises a two dimensional array of elements.

In various embodiments, a relative size and the phase control parameters of each subarray of the plurality of subarrays are provided for a first dimension and a second dimension.

In one embodiment, a ratio of the plurality of subarrays in the first dimension to the plurality of subarrays in the second dimension is based on the number of subarrays.

In one embodiment, a method of a reconfigurable intelligent surface device comprises: receiving a control signal from a controller, wherein the control signal is used to configure a plurality of subarrays; wherein the control signal comprises: a number of subarrays corresponding to the plurality of subarrays; and phase control parameters of each subarray of the plurality of subarrays.

In certain embodiments, each subarray of the plurality of subarrays comprises adjacent elements on a surface of the reconfigurable intelligent surface device.

In some embodiments, each subarray of the plurality of subarrays comprises interleaved elements on a surface of the reconfigurable intelligent surface device.

In various embodiments, the control signal comprises a relative size of each subarray of the plurality of subarrays in each dimension.

In one embodiment, the phase control parameters comprise a phase gradient of each subarray of the plurality of subarrays in each dimension.

In certain embodiments, in response to the control signal not indicating a size of each subarray of the plurality of subarrays in each dimension, each subarray of the plurality of subarrays has the same size.

In some embodiments, the method further comprises receiving information indicating a partitioning scheme or configuring the partitioning scheme prior to receiving the control signal.

In various embodiments, the partitioning scheme comprises an adjacent scheme or an interleaved scheme.

In one embodiment, the control signal is received from a base station.

In certain embodiments, the reconfigurable intelligent surface device comprises only a one dimensional array of elements.

In some embodiments, the reconfigurable intelligent surface device comprises a two dimensional array of elements.

In various embodiments, a relative size and the phase control parameters of each subarray of the plurality of subarrays are provided for a first dimension and a second dimension.

In one embodiment, a ratio of the plurality of subarrays in the first dimension to the plurality of subarrays in the second dimension is based on the number of subarrays.

In one embodiment, an apparatus comprises a reconfigurable intelligent surface device. The apparatus further comprises: a receiver that receives a control signal from a controller, wherein the control signal is used to configure a plurality of subarrays; wherein the control signal comprises: a number of subarrays corresponding to the plurality of subarrays; and phase control parameters of each subarray of the plurality of subarrays.

In certain embodiments, each subarray of the plurality of subarrays comprises adjacent elements on a surface of the reconfigurable intelligent surface device.

In some embodiments, each subarray of the plurality of subarrays comprises interleaved elements on a surface of the reconfigurable intelligent surface device.

In various embodiments, the control signal comprises a relative size of each subarray of the plurality of subarrays in each dimension.

In one embodiment, the phase control parameters comprise a phase gradient of each subarray of the plurality of subarrays in each dimension.

In certain embodiments, in response to the control signal not indicating a size of each subarray of the plurality of subarrays in each dimension, each subarray of the plurality of subarrays has the same size.

In some embodiments, the apparatus further comprises a processor, wherein the receiver receives information indicating a partitioning scheme or the processor configures the partitioning scheme prior to receiving the control signal.

In various embodiments, the partitioning scheme comprises an adjacent scheme or an interleaved scheme.

In one embodiment, the control signal is received from a base station.

In certain embodiments, the reconfigurable intelligent surface device comprises only a one dimensional array of elements.

In some embodiments, the reconfigurable intelligent surface device comprises a two dimensional array of elements.

In various embodiments, a relative size and the phase control parameters of each subarray of the plurality of subarrays are provided for a first dimension and a second dimension.

In one embodiment, a ratio of the plurality of subarrays in the first dimension to the plurality of subarrays in the second dimension is based on the number of subarrays.

Embodiments may be practiced in other specific forms. One or more of the embodiments described herein may be combined to form another embodiment. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a controller, the method comprising:
- transmitting information indicating a partitioning scheme to a reconfigurable intelligent surface device that partitions the reconfigurable intelligent surface device into a plurality of subarrays, wherein the information indicating the partitioning scheme defines a spatial arrangement of elements of the reconfigurable intelligent surface device into two or more independently controllable subarrays; and
- after transmitting the information indicating the partitioning scheme, transmitting a control signal to the reconfigurable intelligent surface device to configure the plurality of subarrays, wherein the control signal comprises phase control parameters of each subarray of the plurality of subarrays, and wherein the phase control parameters are independently configurable for each subarray to generate respective reflection directions for different subarrays.

2. The method of claim 1, wherein each subarray of the plurality of subarrays comprises adjacent elements on a surface of the reconfigurable intelligent surface device.

3. The method of claim 1, wherein each subarray of the plurality of subarrays comprises interleaved elements on a surface of the reconfigurable intelligent surface device.

4. The method of claim 1, wherein the information indicating the partitioning scheme comprises a relative size of each subarray of the plurality of subarrays in each dimension.

5. The method of claim 1, wherein the phase control parameters comprise a phase gradient of each subarray of the plurality of subarrays in each dimension.

6. A controller, comprising:
- at least one memory; and
- at least one processor coupled with the at least one memory and configured to cause the controller to:
  - transmit information indicating a partitioning scheme to a reconfigurable intelligent surface device that partitions the reconfigurable intelligent surface device into a plurality of subarrays, wherein the information indicating the partitioning scheme defines a spatial arrangement of elements of the reconfigurable intelligent surface device into two or more independently controllable subarrays; and
  - after transmitting the information indicating the partitioning scheme, transmit a control signal to the reconfigurable intelligent surface device to configure the plurality of subarrays, wherein the control signal comprises phase control parameters of each subarray of the plurality of subarrays, and wherein the phase control parameters are independently configurable for each subarray to generate respective reflection directions for different subarrays.

7. The controller of claim 6, wherein each subarray of the plurality of subarrays comprises adjacent elements on a surface of the reconfigurable intelligent surface device.

8. The controller of claim 6, wherein each subarray of the plurality of subarrays comprises interleaved elements on a surface of the reconfigurable intelligent surface device.

9. The controller of claim 6, wherein the information indicating the partitioning scheme comprises a relative size of each subarray of the plurality of subarrays in each dimension.

10. The controller of claim 6, wherein the phase control parameters comprise a phase gradient of each subarray of the plurality of subarrays in each dimension.

11. The controller of claim 6, wherein, in response to the information indicating the partitioning scheme not indicating a size of each subarray of the plurality of subarrays in each dimension, each subarray of the plurality of subarrays has the same size.

12. The controller of claim 6, wherein the partitioning scheme comprises an adjacent scheme or an interleaved scheme.

13. The controller of claim 6, wherein the controller is located with a base station.

14. The controller of claim 6, wherein the reconfigurable intelligent surface device comprises only a one dimensional array of elements.

15. The controller of claim 6, wherein the reconfigurable intelligent surface device comprises a two dimensional array of elements.

16. The controller of claim 15, wherein a relative size and the phase control parameters of each subarray of the plurality of subarrays are provided for a first dimension and a second dimension.

17. The controller of claim 16, wherein a ratio of the plurality of subarrays in the first dimension to the plurality of subarrays in the second dimension is based on a number of subarrays.

18. A reconfigurable intelligent surface device, comprising:
- at least one memory; and
- at least one processor coupled with the at least one memory and configured to cause the reconfigurable intelligent surface device to:

receive information indicating a partitioning scheme that partitions the reconfigurable intelligent surface device into a plurality of subarrays, wherein the information indicating the partitioning scheme defines a spatial arrangement of elements of the reconfigurable intelligent surface device into two or more independently controllable subarrays; and after receiving the information indicating the partitioning scheme, receive a control signal from a controller, wherein the control signal is used to configure the plurality of subarrays, wherein the control signal comprises phase control parameters of each subarray of the plurality of subarrays, and wherein the phase control parameters are independently configurable for each subarray to generate respective reflection directions for different subarrays.

19. A processor for wireless communication, comprising:

at least one controller coupled with at least one memory and configured to cause the processor to:

receive information indicating a partitioning scheme that partitions a reconfigurable intelligent surface device into a plurality of subarrays, wherein the information indicating the partitioning scheme defines a spatial arrangement of elements of the reconfigurable intelligent surface device into two or more independently controllable subarrays; and after receiving the information indicating the partitioning scheme, receive a control signal from a controller, wherein the control signal is used to configure the plurality of subarrays, wherein the control signal comprises phase control parameters of each subarray of the plurality of subarrays, and wherein the phase control parameters are independently configurable for each subarray to generate respective reflection directions for different subarrays.

* * * * *